United States Patent [19]
Richter et al.

[11] Patent Number: 5,722,477
[45] Date of Patent: Mar. 3, 1998

[54] PIPE CONNECTOR ASSEMBLY WITH INTERNAL LOCKING MECHANISM

[75] Inventors: Michael A. Richter, St. Louis; Michael F. Mullins, St. Charles; Ron L. Reeves, St. Louis; Dale Emge; Robert Tanner, both of St. Charles, all of Mo.

[73] Assignee: The Children's Factory, St. Louis, Mo.

[21] Appl. No.: 638,775

[22] Filed: Apr. 29, 1996

Related U.S. Application Data

[60] Provisional application No. 60/007,103, Oct. 31, 1995.

[51] Int. Cl.$^6$ ............................................. A47G 5/00
[52] U.S. Cl. .................... 160/135; 160/381; 52/285; 403/103; 403/171; 403/231
[58] Field of Search ........................ 160/135, 381; 52/285.1, 285.3, 285.4, 282.2; 403/103, 101, 100, 97, 91, 171, 231

[56] References Cited

U.S. PATENT DOCUMENTS

| | | | |
|---|---|---|---|
| 2,921,773 | 1/1960 | Hoelzer | 403/103 X |
| 4,582,445 | 4/1986 | Warshawsky | 403/97 |
| 4,774,792 | 10/1988 | Ballance | 160/135 X |
| 4,929,113 | 5/1990 | Sheu | 403/91 X |
| 4,958,671 | 9/1990 | Bove | 160/135 |
| 4,970,841 | 11/1990 | Zeigler | 160/135 X |
| 5,058,863 | 10/1991 | Maffet | 160/135 X |
| 5,070,665 | 12/1991 | Marrin et al. | 160/135 X |
| 5,123,768 | 6/1992 | Franklin | 403/97 X |
| 5,259,167 | 11/1993 | Weise | 160/135 X |
| 5,265,969 | 11/1993 | Chusang | 403/103 X |
| 5,352,149 | 10/1994 | Melashenko et al. | 160/135 X |
| 5,414,950 | 5/1995 | Johnson, Sr. | 160/135 X |
| 5,542,151 | 8/1996 | Stranski et al. | 403/97 X |
| 5,581,838 | 12/1996 | Rocco | 403/91 X |

*Primary Examiner*—Blair Johnson
*Attorney, Agent, or Firm*—Paul M. Denk

[57] ABSTRACT

A connector assembly for connecting and locking tubular elements in preselected angular relationships. The connector assembly includes a pair of clevis having tube engaging elements at one end and three clevis rings at the other. The clevis rings of each clevis are interengaged and define a bore. The bore has a plurality of grooves therein. Locking elements, including a locking pin and a locking plug are inserted in the bore. The locking pin and locking plug each have a pair of opposed raised ribs and a pair of opposed resilient locking arms that engage the grooves in the bore. Detents on the ends of the resilient arms engage a space between the interengaged clevis rings to secure the locking elements in place. The tubular elements can be interconnected in a system of frames to suspend function and decorative panels.

6 Claims, 5 Drawing Sheets

PIPE CONNECTOR ASSEMBLY WITH INTERNAL LOCKING MECHANISM

BACKGROUND OF THE INVENTION

This application claims priority to provisional application Ser. No. 60/007,103, filed Oct. 31, 1995.

This invention relates generally to tube connectors and, more specifically, to a connector assembly for connecting two sections of pipe, the connector assembly capable of forming a locking connector having an internal locking system to hold the segments of tubular elements such as pipe in a preselected angular relationship.

Tubular plastic pipe is well known for its intended purposes. However, the inventors have determined that extruded tubular elements, similar to plastic pipe can be used to create a rigid framework to suspend or hold framed elements, for example rigid or semi-rigid panels or flexible functional or decorative panels. For example, the pipe can be connected to make a rectangular frame with fabric panels secured within the frame to function as a panel. Furthermore, it is desirable to connect such panels together to form a panel system. Several frames with associated panels may be joined, for example four panels, to function as a rectangular enclosure. They may be arranged end-to-end and used to form a room divider. Soft panels could be used in a daycare or classroom setting as dividers.

It is desirable, therefore, to have connector assembly for connecting the individual pipe sections together. However, it is also desirable to have the connector fittings function like a hinge so that two or more pipe sections or frames may be joined at a desired angle. However, a simple, flexible hinge does not work well since it cannot be locked in place. If the framework is bumped or jarred, a conventional hinge will flex and distort. Therefore, the hinge should have a locking mechanism.

Also, as stated above, since such panels are to be used around young children, any such connector or hinges should be have an internal locking mechanism that is tamper-proof. Also, it should be designed to avoid pinching of fingers in the event a small child plays with it. Moreover, the connector means should be smoothly molded and avoid any sharp or pointed external surfaces.

Since the panels need to stand up securely, for example when used as a room divider, the connector, at least any connector employed on the bottom of the frame, should have the capability to function as a stand with horizontally protruding foot members to keep the panel from tipping.

SUMMARY OF THE INVENTION

It is among the several objects of the present invention to provide a connector assembly for connecting segments of tubular elements such as plastic pipe together.

It is another object of the invention to provide such a connector assembly that can join the pipe in preselected angular relationships.

Another object of the invention is to provide such a connector assembly that can be adjusted to change the angular relationship.

Another object of the invention is to provide such a connector assembly that can lock the pipe in preselected angular relationship.

Yet another object of the invention is to provide such a connector assembly wherein the locking mechanism is substantially internal of the connector assembly.

Still another object of the invention is to provide such a connector assembly that consists of interchangeable fittings elements.

Yet another object of the invention is to provide such connector assembly that is smooth to the touch and does not present a pinching hazard to a user or third party.

It is another object of the invention to provide a complete system of frames bearing the connector assemblies that can be interconnected in any one of a multitude of configurations.

In accordance with the invention, a system of pipe-like frames with interchangeable connector assemblies is provided that can be used to form a complex of interconnected frames for panels by connecting segments of hollow-ended tubes or pipes together in preselected angular relationships. In the preferred embodiment, as will be described below, the connector assembly is comprised of injection molded plastic elements consisting of a two interengaging clevises, a locking plug and locking pin.

Each clevis has one generally tubular end which is inserted into the open end of a section of pipe and locked into place by two opposed flexible resilient arms formed on the tubular end, the arms having detents which project through square holes punched into the pipe. The opposite end of the each clevis consists of three circular rings. The circular rings are arranged asymmetrically with two rings of each clevis located on one side of a center space and a third ring of each clevis on other side of the center line. When two clevises are properly aligned and interengaged, the two rings of one clevis are one each side of the third ring of the other clevis and vice versa. The result is that on either side of the center line, there are three rings, two from one clevis positioned on either side of a single ring from the other clevis. At the center line, between the two sets of three interengaged rings, is a space to allow room for detents on a locking plug and locking pin space to seat.

The interior surfaces of the interengaged clevis rings cooperate to form a bore. The inside surface of each clevis ring has notches which line up to form grooves when the clevis rings are interengaged and the clevises are aligned at preselected angles, for example 90°, 135°, 180°, 225°, and 270°. The locking plug and locking pin each have a substantially tubular sections dimension to seat in the bore. The locking pin and locking plug each have two raised bosses which fit into the grooves in the rings. In addition, they each have two resilient arms that engaged the grooves. The arms have detents which protrude into the space between the two sets of three interlocking rings.

To insert the locking plug and the locking pin, the rings of the clevises need to be interengaged and lined up in the desired angular arrangement. The plug or pin is then pressed into place in the bore defined by the clevis rings. The raised ribs and resilient arms engage grooves and the detents on the ends of the locking arms are resiliently biased into the space between the rings. To remove the plug or pin requires depressing the two locking arms to disengage the detents and then the plug or pin can be withdrawn. This removable feature also allows the relative angular relationship of the clevises to be changed. The clevises can be rotated so that the interior notches align to form grooves with the devises in a different angular relationship. As stated above, the alignment of the notches allows a discrete adjustments of approximately 45 degrees.

Additional fittings parts include a double claw clip consisting of molded opposed arms projecting from opposite sides of common connector; and which are designed to clip around a piece of pipe. The double claw can thus be used to hold two parallel pieces of pipe together and would be used to join one panel to its adjacent panels.

There also is a single claw which is designed to be inserted into the end of a piece of pipe and then, using the claw, attach to another existing piece of pipe. A plug designed to close off the end of an open piece of pipe, also is provided.

BRIEF DESCRIPTION OF THE DRAWINGS

Corresponding reference figures indicate corresponding elements throughout the various drawings.

DESCRIPTION OF THE INVENTION

Figure 1A:
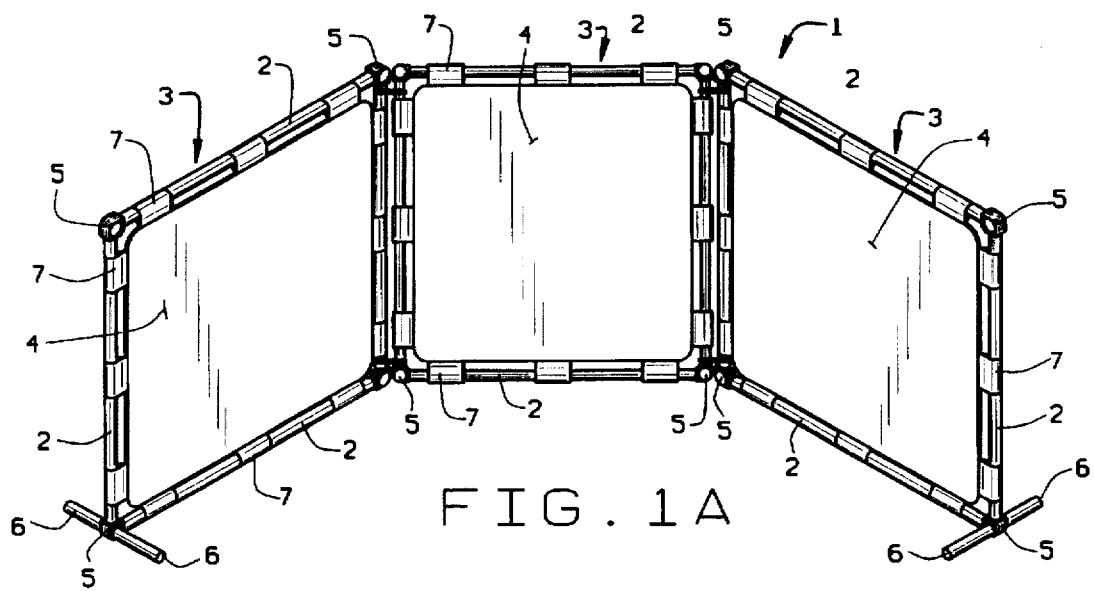
FIG. 1A is an isometric view of a framework employing the connector assembly of the present invention with a plurality of removable panels arranged at approximately 130° angles.
Figure 1B:
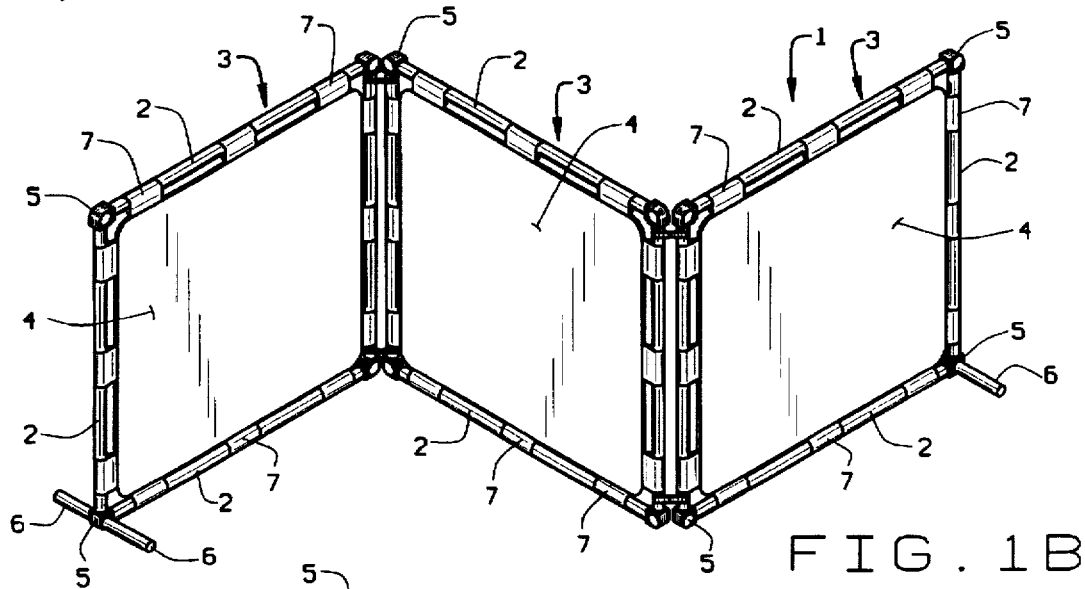
FIG. 1B is an isometric view of a framework employing the connector assembly of the present invention with a plurality of removable panels arranged at approximately 90° angles.
Figure 1C:
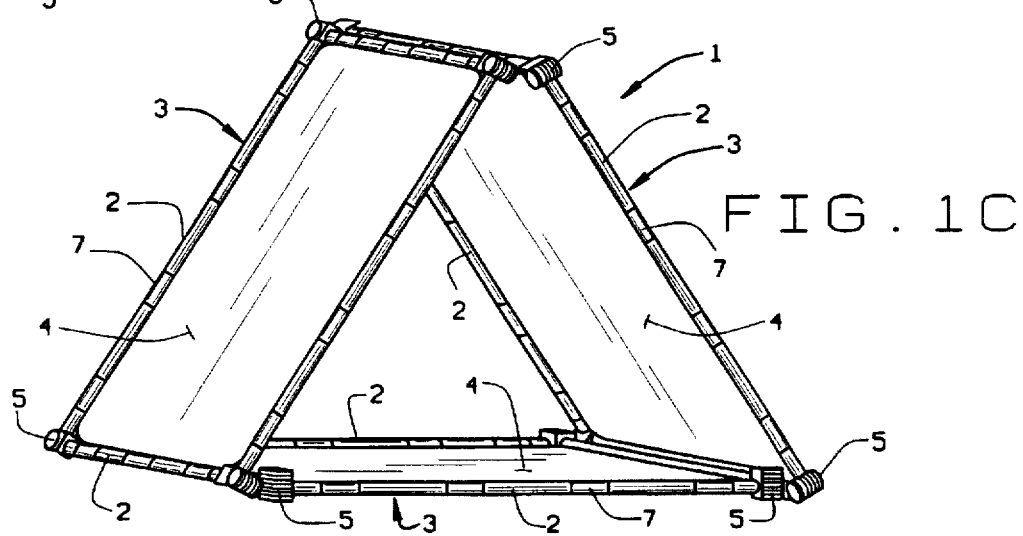
FIG. 1C is an isometric view of another framework illustrating the use of the connector assembly of the present invention.
Figure 2:
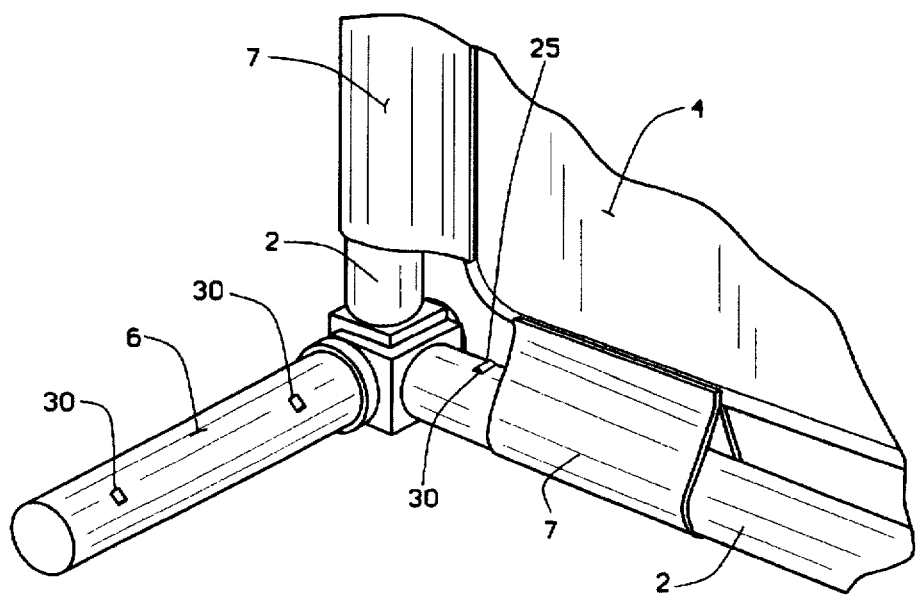
FIG. 2 is a close-up perspective view of a corner of a framework employing the connector assembly of the present invention.

A frame assembly of the present invention, indicated generally by reference numeral 1 in the drawings, is used with hollow-ended tubing, pipe or plastic pipe 2 as a system for creating individual or interconnected frames 3 or frame-like structures. In one primary application, as illustrated in FIGS. 1A–2, the frames are used to suspend removable panels 4 for use as room dividers, play structures, and learning tools in the early childhood education environment. In one preferred embodiment, the frames 3 consists of sections of elongated plastic pipe 2 with connector assemblies 5 which allow the sections of pipe to be joined. As seen in FIGS. 1A and 1B, relatively short sections of pipe 6 can be attached to function as braces to allow the system of panels to stand upright. Panels 4 can be rigid or semi-rigid, can be reflective materials or can be made of fabric (vinyl, cloth, etc.) of various colors, shapes and designs and can be removably attached to frame 3 by use of Velcro strips 7 or other appropriate attachment means such as snaps or hooks, buttons or so forth. Alternatively, panels 4 also can be sewn in such a manner as to create pockets or loops for the insertion of lengths of pipe or tubing in a more permanent arrangement.

As can be seen from the various figures, the connector fitting assemblies 5 allow various angular relationships between adjacent panels 4, as will be explained in greater detail below. In general, however, a connector assembly 5 provides the ability to join two end-to-end aligned pieces of pipe 2 or to join pipe at preselected angles such as 90°, 135°, 180°, 225°, and 270° angles. In the illustrated embodiments, the pipe is PVC plastic pipe. However, the connector assembly 5 could be used with other tubular elements or pipe, particularly lightweight aluminum tubing or the like, in the same or other applications without departing from the scope of the invention. Therefore, as used herein the term pipe or tubing is intended to encompass all types of tubular elements joinable by the connector assembly of the present invention.

The connector assembly 5 includes two substantially identical clevises, each clevis indicated generally by reference numeral 9 in FIGS. 4A, 4B and 6–10. Clevis 9 has a substantially elongated mounting section 11 formed from a generally tubular wall 13 which is inserted into a piece of pipe 2. The mounting section is appropriately dimensioned to slide into the open end of a section of pipe 2, as shown in FIG. 2. The tubular wall 13 has a beveled end 15 to facilitate insertion into the open end of the section of pipe.

There are a pair of openings 17 and 19 formed in opposite sides of tubular wall 13. A first flexible resilient locking arm 21 extends into opening 17 and a second flexible resilient locking arm 23 extends into opening 19. There is a detent 25 formed on the distal end of locking arm 21 and a detent 27 formed on the distal end of locking arm 23. It will be appreciated that the respective locking arms are integrally formed from the tubular wall and, since they are surrounded by the respective openings, are capable of a slight flex or bend into the respective openings under pressure applied to the detents. As best seen in FIG. 2, the ends of pipe segments 2 have a pair of opposed substantially rectangular openings 30 which are punched or otherwise appropriately formed therein at an appropriate distance from the open end of the pipe section to allow seating of the respective detents 25 and 27. When mounting section 11 is inserted into the end of pipe 2, locking arms 21 and 23 can be squeezed to allow the detents to enter the end of the pipe. When the mounting section 11 is appropriately positioned resilient arms 21 and 23 bias the detents 25 and 27 into the openings 30 to secure the clevis in place. For removal, the detents can be depressed to allow withdrawal of mounting end 11 from the pipe.

The opposite end of clevis 9 consists of three clevis rings 34, 36 and 38. The three rings are integrally attached to a substantially rectangular wall 39 that is integrally connected to the proximal end of tubular wall 13. The outer edges of the respective rings are smooth and the inner face of each ring has a plurality of notches formed therein as will be explained in greater detail below.

Figure 4A:
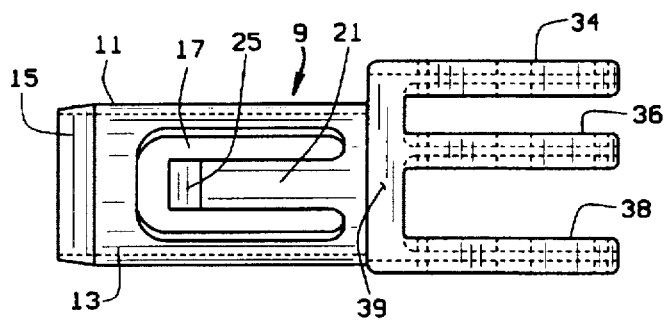
FIG. 4A is a side elevational view of a clevis of the present invention.
Figure 6:
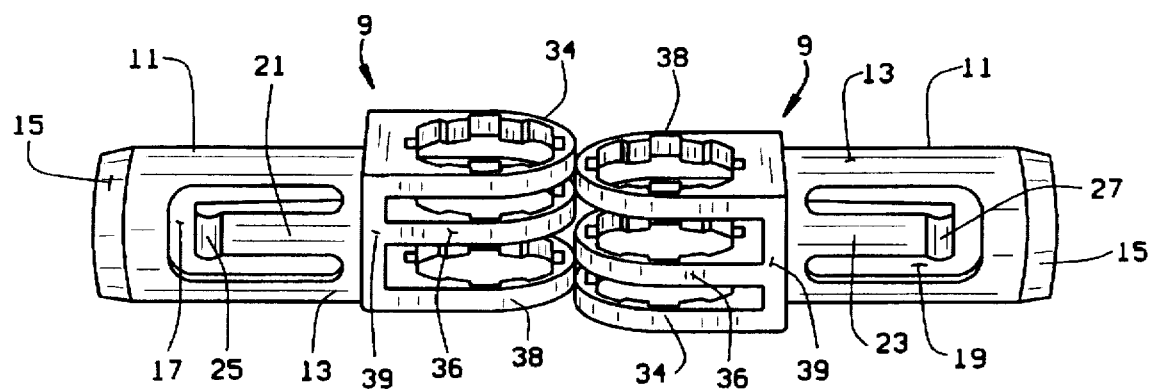
FIG. 6 is a side elevational view of two clevises prior to interengaging.
Figure 7:
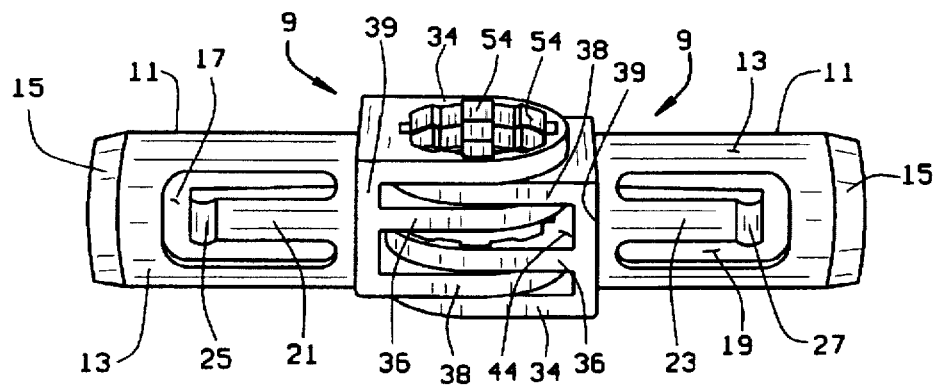
FIG. 7 is a side elevation view of two clevises in an interengaged arrangement.

It will be appreciated from FIG. 4A that the three rings are positioned asymmetrically to the longitudinal axis of the clevis. That is, rings 34 and 36 are on one side of center line and ring 38 is on the other. Thus, the space 40 between ring 36 and 38 is greater than the space 42 between rings 34 and 36. When two clevises are properly aligned, one with ring 38 up and one with ring 38 down, and interengaged, as illustrated in FIGS. 6 and 7, two rings 34 and 36 of one clevis slide around a single ring 38 of the other clevis and vice versa. The result is that on either side of the center line, there are three rings, two from one clevis on either side of one ring from the other clevis. When interengaged, there is a space 44 created between the two sets of three interengaged clevis rings.

Figure 8:
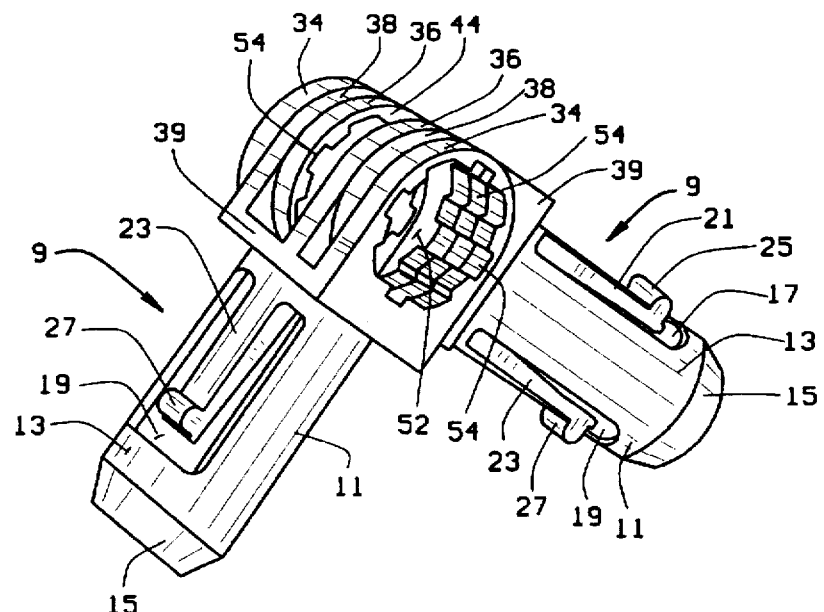
FIG. 8 is a perspective view of two interengaged clevises arranged at a 90° angle.
Figure 9:
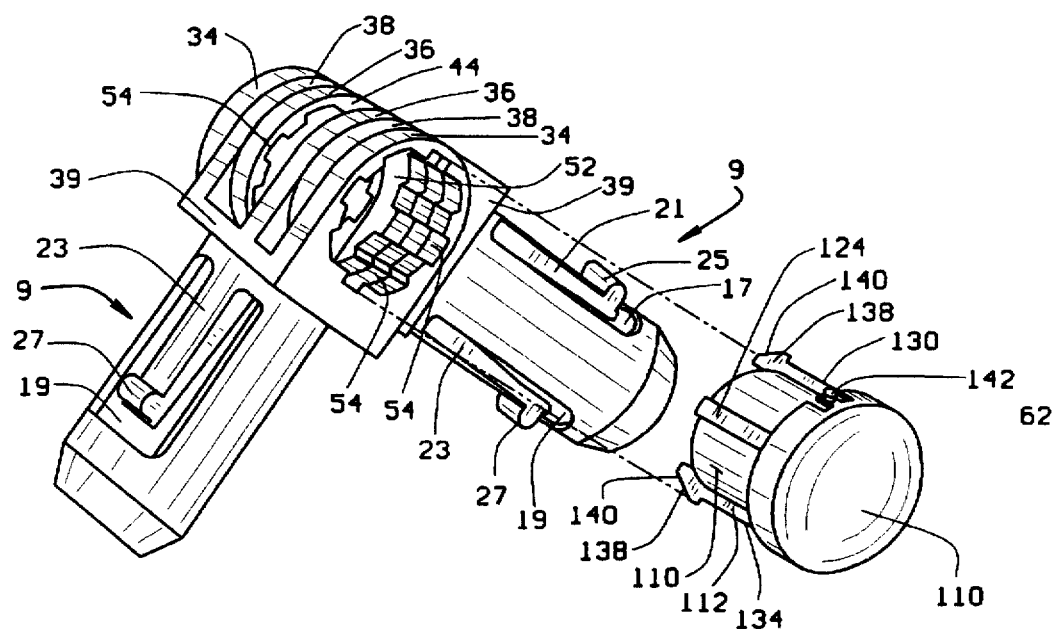
FIG. 9 is a perspective view of the two interengaged socket clevises of FIG. 8 and a locking plug before the insertion of the locking plug.
Figure 10:
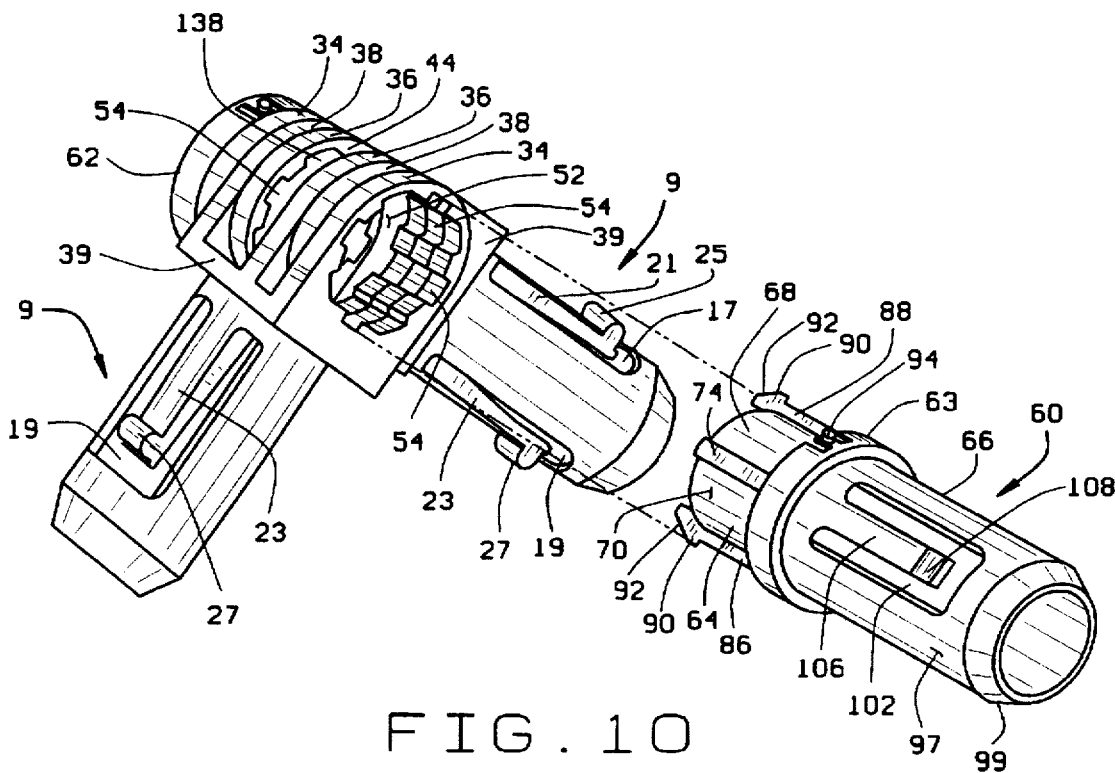
FIG. 10 is a perspective view of the two interengaged clevises of FIG. 8 and a locking pin before the introduction of the locking pin.

As stated above, each of the clevis rings have a substantially smooth outer edge and a plurality of notches formed in the inner face of the rings. The notches of each individual ring, indicated generally by reference numeral 50 in FIG. 4B, are positioned to be in alignment when the clevis rings are interengaged, as shown in FIGS. 8 to 10. It will be appreciated that the notches will line up when the devises are arranged at 90°, 135°, 180°, 225°, and 270° angles to each other. It will be appreciated by those skilled in the art that the notches can be formed in the interior at positions that will allow the arrangement of the devises at angles other than those just mentioned. However, in the illustrated embodiment, preselected angles of 90°, 135°, 180°, 225°, and 270° are used. Also, when the clevis rings are interengaged, as shown in FIGS. 8 to 10 the aligned rings define a bore 52. A plurality of grooves 54 are formed inside bore 52 by the aligned notches 50. A locking pin 60 (FIGS. 3A–3C) and a locking plug 62 (FIGS. 5A and 5B) are designed to insert into bore 52 and engage the grooves 54 to lock the two devises into a preselected angular relationship (e.g. 90°, 135°, 180°, 225°, and 270°), as will now be explained.

Figure 3A:
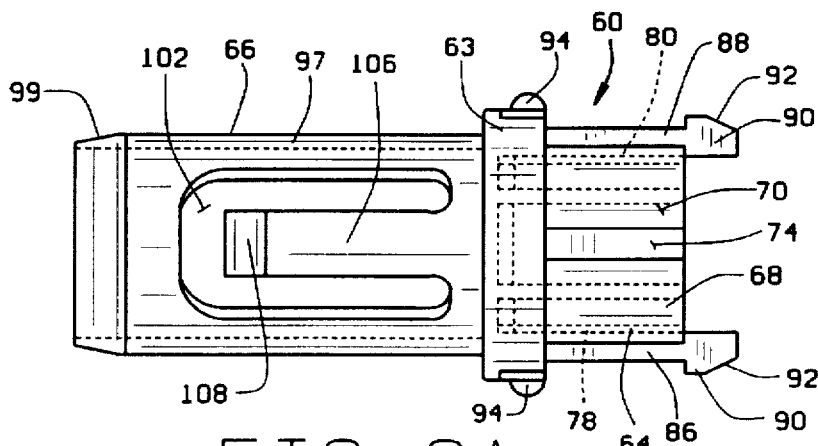
FIG. 3A is a top plan of a locking pin of the present invention.
Figure 3B:
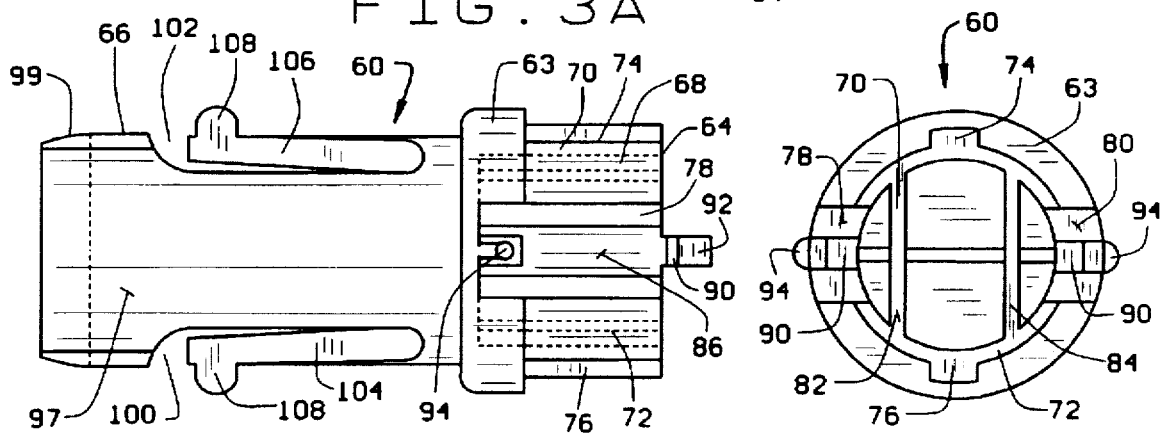
FIG. 3B is a side elevational view of the locking pin of FIG. 3A.
Figure 3C:
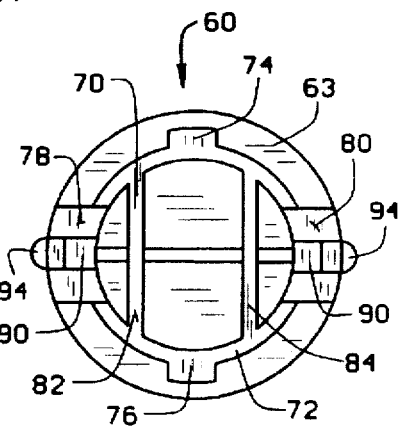
FIG. 3C is an end plan thereof.
Figure 4B:
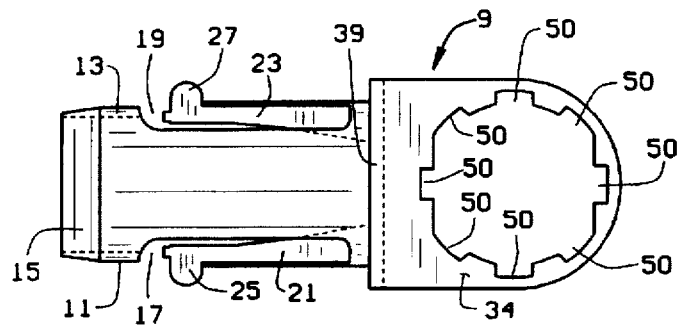
FIG. 4B is a top plan thereof.

The locking pin 60 is shown in greater detail in FIGS. 3A to 3C. Pin 60 has a circular collar 63. There is a concentric locking section 64 on one side of the collar and a concentric, pipe attachment section 66 on the opposite side of the collar. The locking section 64 has a substantially tubular body 68 formed from two opposed arcuate walls 70 and 72. Arcuate wall 70 has a centrally place raised rib 74 on its outer surface and arcuate wall 72 has a centrally placed raised rib 76 on its outer surface. There is a pair of opposed spaces 78 and 80 between the arcuate walls. As best seen in FIG. 3C there are a pair of spaced apart internal support walls 82 and 84 extending between the interior surfaces of the arcuate walls for support. There is a first flexible resilient locking arm 86 extending from collar 63 into space 78 and a second flexible resilient locking arm 88 extending from collar 63 into space 80. As seen from FIG. 3C, the respective locking arms have a slightly arcuate cross section. Further, as shown in FIG. 3A, the entire length of each locking arm protrude above the arcuate walls 70 and 72. It will be appreciated that the locking arms 86 and 88 and the raised ribs 74 and 76 are positioned 90° relative to each other.

Each locking arm has a raised detent 90 on the distal end. Each detent 90 has a sloped or ramped surface 92 to facilitate introduction into bore 52. Further, each locking arm has a knob 94 at its proximal end. Knobs 94 are designed to accept the application force, for example squeezing force exerted by fingers or a tool such as a pliers, to urge the locking arms into the into spaces 78 and 80 so that the locking section can be introduced into the bore formed by the clevis rings. As shown in FIG. 10, the respective clevises can be arranged in a preferred angular relationship. In the illustration, the clevises are arranged so that the mounting sections 11 are at a 90° angle to each other. The notches 50 of each clevis ring are aligned to form a plurality of grooves 54. It should be noted that the clevises can be manipulated so that notches 50 align to form grooves 54 with the clevises being in angular relationship of 90°, 135°, 180°, 225°, and 270°, as stated above. The clevises are shown at 90° for simplicity of illustration. When the notches 50 are properly aligned, the locking section of the locking pin is introduced into bore 54. As stated above, the locking arms can be depressed to allow introduction. The locking arms 86 and 88 engage and seat in opposite grooves 54 and the raised ribs 76 and 78 engage and seat in opposite grooves 54. Moreover, due to the resilient nature of the locking arms, the detents 90 snap into space 44 between the two sets of clevis rings to lock the locking pin 60 in place. The seating of the respective locking arms and ribs in the grooves 54 formed by the aligned notches 50 prevents any rotational movement of the devises, thereby locking them in place. However, the interengaged clevises are further secured and the assembly completely closed by the insertion of the locking plug 62, in the opposite end of bore 52, as will be described below.

Locking pin 69 also has, on the opposite side of the collar, the pipe attachment section 66. Attachment section 66 has a generally tubular wall 97. Wall 97 has a beveled leading edge 99 to facilitate insertion into a section of pipe. There are a pair of openings 100 and 102 formed in opposite sides of tubular wall 97. A first flexible resilient locking arm 104 extends into opening 100 and a second elongated flexible resilient locking arm 106 extends into opening 102. There is a detent 108 formed on the distal end of locking arm 104 and a detent 108 formed on the distal end of locking arm 106. It will be appreciated that the respective locking arms are integrally formed from the tubular wall and, since they are surrounded by the respective openings, are capable of a slight flex or bend into the respective openings under pressure applied to the detents. As best seen in FIG. 2, ends of pipe 2 have at least a pair of opposed substantially rectangular openings 30 which are punched or otherwise appropriately formed therein at an appropriate distance from the open end of the pipe section to allow seating of the respective detents 108. When attachment section 66 is inserted into the end of pipe 2, locking arms 104 and 106 can be squeezed to allow detents 108 to enter the end of the pipe. When the attachment section 66 is appropriately positioned, the resilient arms 104 and 106 bias the detents 108 into the openings 30 to secure the locking pin in open end of a section of pipe. For removal, the detents can be depressed to allow withdrawal of attachment section 66 from the pipe. As can be seen from FIG. 2, locking pin 60 can be positioned to allow the attachment of a vertically extending section of pipe 2 as well as to lock the clevises in the desired angular relationship, as explained above. Further, the locking pin 60 can be attached to a relatively short pipe section 6 (FIG. 2) which functions as a foot or brace (FIGS. 1A, 1B), as stated above.

Figure 5A:
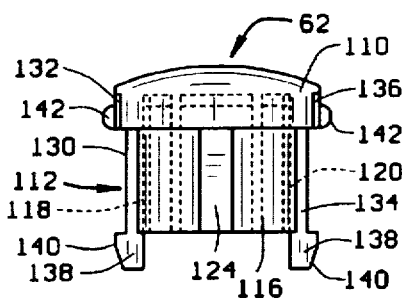
FIG. 5A is a front elevational view of a locking plug of the present invention.
Figure 5B:
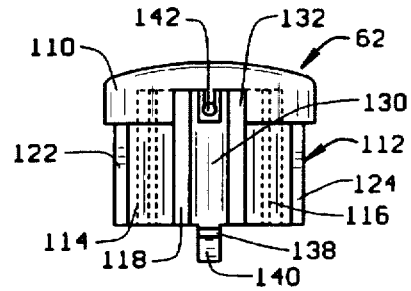
FIG. 5B is a side elevational view thereof.
Figure 5C:
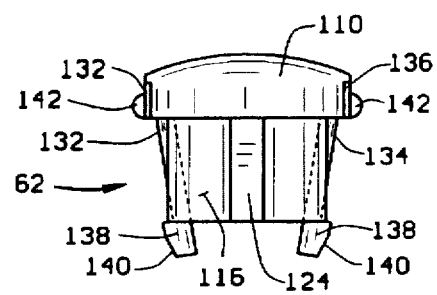
FIG. 5C is a side elevation view thereof with the locking arms depressed.

Locking plug 62, as best seen in FIGS. 5A and 5B, has a generally round cap 110 and a concentric locking section 112. Locking section 112 has a pair of opposed arcuate walls 114 and 116 with opposed spaces 118 and 120 between the arcuate walls. There is a raised rib 122 formed centrally on the outer surface of arcuate wall 114 and a raised rib 124 formed centrally on the outer surface of arcuate wall 116. There is a first flexible, resilient locking arm 130 extending from a cut-out 132 in cap 110 and positioned centrally in space 118 and a second resilient locking arm 134 extending from cut-out 136 in cap 110 and positioned centrally in the opposite space 120. There is a raised locking detent 138 at the distal end of each respective locking arm. Each detent 138 has a angled or ramped face 140 which facilitates introduction into the bore in the clevises. There is a knob 142 formed on the proximal end of each locking arm. Knob 142 is designed to accept the application force, for example squeezing force exerted by fingers or a tool such as a pliers, to urge the locking arms into the tubular body as shown in FIG. 5C so that the plug can be inserted into bore 54. Plug 62 is inserted into the bore in the same manner as the mounting end of the previously described locking pin 60. As shown in FIG. 9, the plug 62 is urged into the bore 52 with the locking arms 130 and 136 engaging opposite grooves 54 and the raised ribs engaging opposite grooves. The detents 138 snap into through space 44 to prevent easy extraction of the plug.

Figure 12:
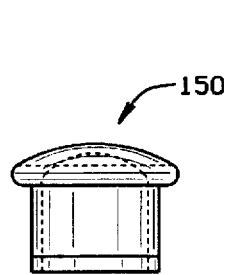
FIG. 12 is a side elevational view of a friction plug of the present invention.

It will be appreciated that the final assembly of the devises locks the clevises in a preselected angular relationship. That angular relationship cannot be changed unless both the locking pin 60 and locking plug are removed. Although the foregoing description and accompanying drawings show the use of one locking pin 60 and a locking plug 62, it will be understood that two locking pins or two locking plugs could be used, depending upon the final design of the frame. Moreover, one of the locking pins alone, i.e. the pin or the plug, would hold the clevises in an interengaged, preselected angular relationship. However, the preferred embodiment contemplates the use of two locking elements, e.g. two pins, two plugs or one pin and one plug. Further, it will be appreciated that the locking elements are contained inside the clevis rings and avoid any exposed hinges that can pinch a user. Moreover, the external surfaces of the assembled unit are smooth and free from sharp edges. Further, the system includes a friction plug 150 (FIG. 12) that can be inserted into the open end of a section of pipe, as shown in FIG. 2, to cover any exposed pipe ends.

Figure 11:
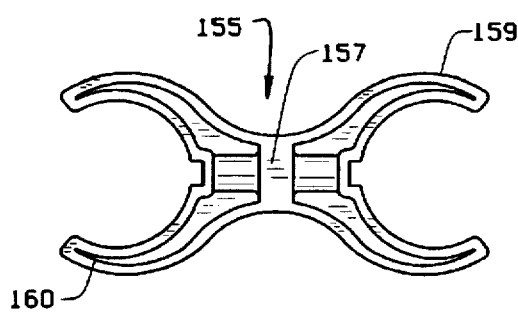
FIG. 11 is a top plan of a double claw connector of the present invention.

Also included in the invention is a double claw pipe connector 155, as shown in FIG. 11. Double claw connector 155 is generally flat having a center section 157 and a first flexible resilient claw 159 on one side and a second flexible resilient claw 160 on the other side. The respective claws are dimension to fit around and grasp a pipe 2. The double claw connector 155 is used to connect two sections of pipe, and further stabilize or join the pipes, as needed.

Figure 13A:
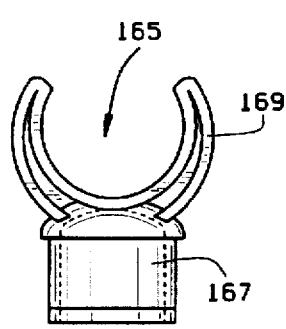
FIG. 13A is a front elevational view of a single claw of the present invention.
Figure 13B:
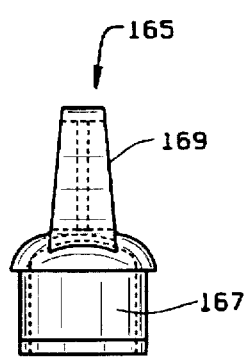
FIG. 13B is a side elevational view thereof.

There is also a single claw pipe connector 165 (FIGS. 13A and 13B) which is designed to be inserted into the end of a piece of pipe and then, using the claw, attach to another existing piece of pipe. Single claw 165 has a substantially tubular section 167 designed to fit into the open end of a section of pipe with a snug friction fit and a flexible, resilient claw 169 dimensioned to engage a pipe.

It will be appreciated by those skilled in the art that the fittings described above can be used with any tubular pipe. Although the invention was described in use with decorative or functional panels, it will be appreciated that the fittings can be used in other applications to join tubular elements such as pipe or the like without departing from the scope of the invention.

We claim:

1. A panel assembly comprising:

a plurality of interconnected frames, each frame having at least four tubular elements arranged in a substantially rectangular configuration;

a removable panel secured to each frame;

a plurality of connector assemblies for joining the tubular elements in each frame and for connecting the frames in preselected angular relationships;

each connector assembly comprising a first clevis having a series of integral clevis rings, a second clevis having a series of integral clevis rings, the clevis rings of the first clevis being interengaged with the clevis rings of the second clevis, a first locking element secured within the interengaged clevis of an adjacent tubular element rings, and a second locking element secured within the interengaged clevis rings so as to secure the clevises together in a preselected angular relationship.

2. The panel assembly of claim 1 wherein the removable panels are comprised of a fabric material.

3. The panel assembly of claim 1 wherein the tubular elements are extruded plastic pipe.

4. The panel assembly of claim 1 wherein the interengaged clevis rings are secured by the second locking element to fix the frames at preselected angular relationship of 45° increments.

5. The panel assembly of claim 1 wherein the frames of the panel assembly are locked together at preselected angular relationships of one of 45°, 90°, 135°, 180°, 225°, and 270° angle with respect to each other.

6. The panel assembly of claim 3 wherein each connector assembly includes a locking finger for joining the connector assembly to each tubular element of a frame.

* * * * *

UNITED STATES PATENT AND TRADEMARK OFFICE
CERTIFICATE OF CORRECTION

PATENT NO. : 5,722,477
DATED : March 3, 1998
INVENTOR(S) : Michael A. Richter, et al.

It is certified that error appears in the above-indentified patent and that said Letters Patent is hereby corrected as shown below:

Column 8, Claim 1, line 29, after "the second clevis" insert ---of an adjacent tubular element,---.

Column 8, Claim 1, line 30, delete "of an adjacent tubular element".

Signed and Sealed this

Twenty-eighth Day of July, 1998

*Attest:*

BRUCE LEHMAN

*Attesting Officer*     *Commissioner of Patents and Trademarks*